Patented Mar. 20, 1945

2,371,759

UNITED STATES PATENT OFFICE 2,371,759

PROCESS FOR TREATMENT OF AQUEOUS FLUORIDE SOLUTIONS

Robert A. King, New York, N. Y., and James Cole Word, Jr., and John J. Sims, Phillips, Tex., assignors to Phillips Petroleum Company, a corporation of Delaware No Drawing. Application January 1, 1944, Serial No. 516,738

10 Claims. (Cl. 23—88)

This invention relates to the neutralization of fluid fluoride catalysts. In a specific modification this invention relates to the protection of personnel and of equipment connected with the operation of a conversion plant in which is used a fluid fluoride catalyst, such as hydrofluoric acid, boron trifluoride, mixtures comprising hydrofluoric acid and boron trifluoride, catalytic complexes comprising one or both of these materials such as the complex resulting from saturating, with boron trifluoride, water, alcohols, acids, of phosphorus or the like, and antimony fluorides.

In the course of operating a plant employing a fluid fluoride catalyst it is inevitable that a certain amount of the catalyst will escape. Such escaping will occur through leaks around valve stems, leaks through pump packings, when residual catalyst is present in equipment which is removed from operation and opened to the atmosphere, when equipment unavoidably breaks, and the like. This escaping catalyst is not the catalyst which is removed from the system for regeneration since such regeneration occurs in equipment designed for that purpose. The escaping catalyst may escape as a gas, particularly when the catalyst comprises hydrogen fluoride or boron trifluoride, or may escape as a liquid as when hydrogen fluoride is used at a low temperature, when a complex of boron trifluoride and water or other inorganic compounds is used, or when it is possible to flush leaking equipment with water. It has been found that such catalysts present hazards not found with other catalysts such as sulfuric acid, phosphoric acid and the like, in that the fluoride ion produces extremely deep, persistent and painful burns when such fluoride catalysts come into contact with the human skin. Thus hydrofluoric acid has a double action on the skin, the burn resulting directly from the acid and the pain and subsequent complications resulting from penetration of the fluoride ion into the skin and tissues of the human body. These burns result not only from direct contact of a fluoride catalyst with the body, but also from handling tools which have come into contact with the acid, and it has been found that such tools will produce burns, when handled, even after a somewhat thorough washing with ordinary water.

It has been found that careful design of equipment and handling of the equipment by the personnel involved will eliminate, or at least greatly reduce, personnel hazards when a fluid fluoride catalyst is used in a conversion plant. The equipment which will result in protection includes providing vapor lines and connections through which any escaping vapors from leaks, such as those above enumerated, can be withdrawn from enclosed conduits and providing suitable means for promptly flushing with water equipment upon which such a fluid catalyst may have been spilled. However, it is necessary to neutralize such escaping catalyst. This neutralization can be effected by dissolving the catalyst in water and precipitating the fluoride as an insoluble fluoride, such as the fluoride of calcium, magnesium, strontium, or barium. Thus, aqueous solutions of a fluoride catalyst, such as aqueous hydrofluoric acid, may be neutralized by adding slaked lime, or calcium hydroxide. The calcium fluoride formed by this neutralization in a resulting slightly alkaline solution is largely suspended in a more or less colloidal state, generally mixed with unreacted suspended calcium hydroxide. It is desirable to coagulate this suspended sludge so that the water may be decanted and discharged and the calcium fluoride sludge removed for final disposition.

We have found that it is extremely difficult to effect satisfactorily complete neutralization of the fluoride content of such a solution, and to coagulate the resulting precipitate from a neutral or slightly alkaline solution by the addition of a coagulant, such as ferric sulfate, aluminum sulfate, or the like. The addition of such a common coagulant results in the formation of a gel which is impossible to separate from water by ordinary means.

It is an object of this invention to neutralize a fluid fluoride catalyst.

It is a further object of this invention to neutralize an escaping fluid fluoride catalyst from a conversion plant with a minimum of consumption of neutralizing material.

Still another object of this invention is to effect a rapid precipitation and settling of calcium fluoride or similar insoluble fluoride formed in the neutralization of an aqueous fluoride solution.

Further objects and advantages of our invention will become apparent, to one skilled in the art, from the accompanying disclosure and discussion.

We have found that the neutralization and precipitation of the fluoride content of an aqueous fluoride solution may be quickly and economically effected by contacting the solution with a sodium and calcium hydroxide, in amounts such that there is sufficient calcium hydroxide to form calcium fluoride by reaction with all of the fluoride present and sufficient sodium hydroxide to give a resulting aqueous mixture which is alkaline to the extent of at least about 5 grains per gallon of titratable hydroxyl concentration, preferably about 10 grains per gallon. The two hydroxides may be added separately or together. Generally common lime contains an appreciable amount of sodium hydroxide as impurity. Any additional amount of sodium hydroxide which may be necessary may be added in the form of caustic alkali or soda ash. After sufficient amounts of these hydroxides have been added the concentration of sodium ion in the resulting aqueous mixture is further increased by adding sodium chloride in an amount of at least between about 0.5 and 5 pounds per thousand gallons of the aqueous mixture. This appears to aid in producing a calcium fluoride precipitate having more desirable physical characteristics. After these chemicals have been added a coagulant, such as ferric sulfate or aluminum sulfate, is added with agitation in an amount between about 0.25 and about 12 pounds per thousand gallons of the solution. When larger amounts of such a coagulant are added it may be necessary to add additional caustic alkali to insure that the alkalinity of the resulting mixture is sufficiently high. After thoroughly mixing the coagulant with the aqueous material it is found that the calcium fluoride precipitate readily settles leaving a clear supernatant liquid which can be readily drained and discharged without harm, and which does not have more than about 12 to about 20 parts per million of fluoride ion.

This neutralization and precipitation of the aqueous fluoride solution may be carried out either continuously or in batches. In either case it is often found desirable to mix with the aqueous material being neutralized and coagulated the precipitate from a previous treatment. When this is done it is found that the amount of coagulant which is necessary to produce a satisfactory precipitate can be rapidly reduced to a value in the lower part of the range previously mentioned.

As an example of the practice of our invention, to a dilute solution of hydrofluoric acid, which collected in a drainage pit in a plant where hydrofluoric acid was used as a hydrocarbon conversion catalyst, commercial lime was added in an amount sufficient to give a resulting solution having 10 grains per gallon of titratable hydroxyl alkalinity; to the resulting solution was then added about 1.4 lbs. of sodium chloride per thousand gallons; following this, ferric sulfate was added in an amount of about 6 pounds per thousand gallons. The aqueous material was constantly agitated during the addition of these chemicals and for 30 minutes thereafter. After the agitation was discontinued the aqueous material was settled for two hours after which the calcium fluoride had almost completely precipitated leaving a clear supernatant liquid. This liquid was drained at the rate of 6 inches every hour until the sludge level had been reached. The sludge was retained in the settling pit and additional dilute aqueous hydrofluoric acid was added and precipitated. The amount of ferric sulfate necessary to effect satisfactory coagulation was less for each succeeding batch until finally, when sufficient precipitated sludge had accumulated to necessitate the removal of a portion thereof, it was necessary to add ferric sulfate to the extent of only about 0.5 pound per thousand gallons.

This invention has particular application to the removal of fluoride from solutions which accumulate in the drainage pits from processes in which hydrocarbons are converted with fluoride catalysts, such as when paraffin hydrocarbons are isomerized, paraffin or aromatic hydrocarbons are alkylated, or olefin hydrocarbons are polymerized. It will be readily appreciated that our invention has numerous embodiments and that various modifications thereof may be applied and practiced by one skilled in the art without departing from the spirit of the teachings or from the scope of the claims.

We claim:

1. A process for neutralizing the fluoride content of an aqueous solution of hydrofluoric acid, which comprises adding to said solution an alkali comprising sodium and calcium hydroxides in an amount sufficient to effect precipitation of substantially all fluoride as calcium fluoride and to result in a titratable hydroxyl concentration of about 10 grains per gallon, adding sodium chloride in an amount of about 1.4 pounds per 1,000 gallons, and subsequently adding ferric sulfate in an amount between about 0.25 and 12 pounds per 1,000 gallons and sufficient to effect coagulation of precipitated calcium fluoride and form a precipitate which readily settles from the resulting solution.

2. The process of claim 1 in which said precipitation is conducted in the presence of at least a portion of the precipitate from a prior precipitation to reduce the amount of ferric sulfate necessary to effect coagulation.

3. A process for neutralizing the harmful hydrogen fluoride content of an aqueous solution of a fluoride, which comprises adding to said solution an alkali comprising sodium and calcium hydroxides in an amount sufficient to effect precipitation of substantially all fluoride as calcium fluoride and to result in a titratable hydroxyl concentration of about 10 grains per gallon, adding sodium chloride in an amount of about 1.4 pounds per 1,000 gallons, and subsequently adding ferric sulfate in an amount between about 0.25 and 12 pounds per 1,000 gallons and sufficient to effect coagulation of precipitated calcium fluoride and form a precipitate which readily settles from the resulting solution.

4. A process for neutralizing the harmful hydrogen fluoride content of an aqueous solution of a fluoride, which comprises adding to said solution sodium and calcium hydroxides in amounts sufficient to effect precipitation of substantially all fluoride as calcium fluoride and to result in a titratable hydroxyl concentration of at least about 5 grains per gallon, adding also to said mixture sodium chloride in an amount of at least 0.5 pound per 1,000 gallons, and subsequently adding ferric sulfate in an amount between about 0.25 and 12 pounds per 1,000 gallons and sufficient to effect coagulation of precipitated calcium fluoride and form a precipitate which readily settles from the resulting solution.

5. A process for neutralizing the harmful hydrogen fluoride content of an aqueous solution of a fluoride, which comprises adding to said solution sodium and calcium hydroxides in amounts sufficient to effect precipitation of substantially all fluoride as calcium fluoride and to result in a titratable hydroxyl concentration of at least about 5 grains per gallon, adding also to said mixture sodium chloride in an amount of at least 0.5 pound per 1,000 gallons, and subsequently adding a coagulant of the class consisting of ferric sulfate and aluminum sulfate in an amount between about 0.25 and 12 pounds per 1,000 gallons and sufficient to effect coagulation of precipitate calcium fluoride and form a precipitate which readily settles from the resulting solution.

6. A process for neutralizing the harmful hydrogen fluoride content of an aqueous solution of a fluoride, which comprises adding to said solution sodium and calcium hydroxides in amounts sufficient to effect precipitation of substantially all fluoride as calcium fluoride and to result in a titratable hydroxyl concentration of at least about 5 grains per gallon, adding also to said mixture sodium chloride in an amount of at least 0.5 pound per 1,000 gallons, and subsequently adding aluminum sulfate in an amount between about 0.25 and 12 pounds per 1,000 gallons and sufficient to effect coagulation of precipitated calcium fluoride and form a precipitate which readily settles from the resulting solution.

7. A process for decreasing the fluoride content of an aqueous solution of hydrofluoric acid, which comprises adding to said solution an alkali comprising sodium and calcium hydroxides in an amount sufficient to effect precipitation of substantially all fluoride as calcium fluoride and to result in a titratable hydroxyl concentration of about 10 grains per gallon, adding sodium chloride in an amount of about 1.4 pounds per 1,000 gallons, and subsequently adding ferric sulfate in an amount between about 0.25 and 12 pounds per 1,000 gallons and sufficient to effect coagulation of precipitated calcium fluoride and form a precipitate which readily settles from the resulting solution, and separating a solution so obtained and having a decreased fluoride content from said precipitated and coagulated calcium fluoride.

8. A process for decreasing the fluoride content of an aqueous solution of a fluoride, which comprises adding to said solution sodium and calcium hydroxides in amounts sufficient to effect precipitation of substantially all fluoride as calcium fluoride and to result in a titratable hydroxyl concentration of at least about 5 grains per gallon, adding also to said mixture sodium chloride in an amount of at least 0.5 pound per 1,000 gallons, and subsequently adding ferric sulfate in an amount between about 0.25 and 12 pounds per 1,000 gallons and sufficient to effect coagulation of precipitated calcium fluoride and form a precipitate which readily settles from the resulting solution, and separating a solution so obtained and having a decreased fluoride content from said precipitated and coagulated calcium fluoride.

9. A process for decreasing the fluoride content of an aqueous solution of a fluoride, which comprises adding to said solution sodium and calcium hydroxides in amounts sufficient to effect precipitation of substantially all fluoride as calcium fluoride and to result in a titratable hydroxyl concentration of at least about 5 grains per gallon, adding also to said mixture sodium chloride in an amount between about 0.5 and 5 pounds per 1,000 gallons, and subsequently adding a coagulant of the class consisting of ferric sulfate and aluminum sulfate in an amount between about 0.25 and 12 pounds per 1,000 gallons and sufficient to effect coagulation of precipitated calcium fluoride and form a precipitate which readily settles from the resulting solution, and separating a solution so obtained and having a decreased fluoride content from said precipitated and coagulated calcium fluoride.

10. A process for decreasing the fluoride content of an aqueous solution of a fluoride, which comprises adding to said solution sodium and calcium hydroxides in amounts sufficient to effect precipitation of substantially all fluoride as calcium fluoride and to result in a titratable hydroxyl concentration of at least about 5 grains per gallon, adding also to said mixture sodium chloride in an amount of at least 0.5 pound per 1,000 gallons, and subsequently adding aluminum sulfate in an amount between about 0.25 and 12 pounds per 1,000 gallons and sufficient to effect coagulation of precipitated calcium fluoride and form a precipitate which readily settles from the resulting solution, and separating a solution so obtained and having a decreased fluoride content from said precipitated and coagulated calcium fluoride.

ROBERT A. KING.
JAMES COLE WORD, JR.
JOHN J. SIMS.